United States Patent
Hung et al.

(10) Patent No.: US 8,639,237 B2
(45) Date of Patent: Jan. 28, 2014

(54) METHOD FOR CONTROLLING ACCESS AT USER END

(75) Inventors: Kuo-Wei Hung, Kaohsiung (TW); Ying-Sheng Kuo, Taipei (TW); Ching-Feng Hsieh, Taipei (TW)

(73) Assignees: Askey Technology (Jiangsu) Ltd., Jiangsu Province (CN); Askey Computer Corporation, Taipei (TW)

( * ) Notice: Subject to any disclaimer, the term of this patent is extended or adjusted under 35 U.S.C. 154(b) by 71 days.

(21) Appl. No.: 13/308,504

(22) Filed: Nov. 30, 2011

(65) Prior Publication Data

US 2013/0035088 A1   Feb. 7, 2013

(30) Foreign Application Priority Data

Aug. 5, 2011   (TW) ............................... 100127905 A

(51) Int. Cl.
*H04W 4/00* (2009.01)
*H04W 40/00* (2009.01)

(52) U.S. Cl.
USPC ..................... 455/422.1; 455/435.1; 455/446; 370/328

(58) Field of Classification Search
USPC ....................................................... 455/422.1
See application file for complete search history.

(56) References Cited

U.S. PATENT DOCUMENTS

| | | | |
|---|---|---|---|
| 2005/0239453 A1* | 10/2005 | Vikberg et al. | 455/426.1 |
| 2008/0132188 A1* | 6/2008 | Nino et al. | 455/187.1 |
| 2008/0242298 A1* | 10/2008 | Nylander et al. | 455/435.2 |

* cited by examiner

*Primary Examiner* — Steven S. Kelley
*Assistant Examiner* — Andy Gu

(57) ABSTRACT

A system and a method for controlling access at a user end are disclosed. The correlation between a tag signal of a femtocell access point and a tag signal of a fixed internet device is established, such that when the femtocell access point would access internet via the fixed internet device, a tag signal of the femtocell access point and a tag signal of the fixed internet device are acquired, so as to determine whether the tag signal of the femtocell access point and the tag signal of the fixed internet device match the correlation in the data bank. When the tag signal of the femtocell access point and the tag signal of the fixed internet device match the correlation, the femtocell access point is allowed to provide access services. The present invention provides an effective mechanism for controlling access at a user end.

7 Claims, 3 Drawing Sheets

METHOD FOR CONTROLLING ACCESS AT USER END

BACKGROUND OF THE INVENTION

1. Field of the Invention

The present invention relates to technology for controlling access at a user end, and more particularly, to a system and a method for controlling access at a user end in the femtocell technology field.

2. Description of Related Art

A femtocell extends mobile communication indoor coverage, and is an ideal solution for fixed mobile convergence (FMC). A femtocell is a typical base station such as a wireless base station access (NodeB, for example), and includes RNC (radio network controller for GSM and BCS) and all core internet components. The femtocell may connect to core internet in mobile communication only via connecting to DSL or internet wired connection. Thus, a femtocell may connect to existing bandwidth to provide FMC services.

Further, in comparison with the common wireless base stations, a femtocell access point (FAP), which may simultaneously support communication terminal devices for up to 50 voice, image or data transmission services, is placed at a user end such as user home. The setting of wireless parameters is managed by a mobile communication company, and the FAP may connect to core internet via different areas or countries. Therefore, in order to reduce loss of forward service fees, the mobile communication company would lock the position of the FAP to prevent a client from moving the FAP out of the position.

In the current technology, longitude and latitude of the position of the FAP are calculated by GPS technology or searching macro cell base station, and the information of the longitude and latitude is transmitted back to the home NodeB management system (HMS) via a specific transmission protocol such as TR069, so as to determine whether the FAP may provide internet access services. However, if the FAP cannot receive signals from GPS or macro cell base station (for example, the FAP is placed at the basement) and the mobile communication company cannot determines the position of the FAP, it fails to determine whether the FAP is within the geographical range of the access services, such that the profit of the mobile communication company is reduced.

SUMMARY OF THE INVENTION

The present invention provides a method for controlling access at a user end, so as to effectively provide an access control mechanism for access services at the FAP user end.

In the present of the present invention, when the user end connects to internet provided by a mobile communication company via a fixed internet device by using a femtocell access point, access services of the femtocell access point are controlled, and the method for controlling access at a user end includes the steps of: recording a tag signal of the femtocell access point, allowing the femtocell access point to access a tag signal of the fixed internet device, establishing in a data bank a correlation between the tag signal of the femtocell access point and the tag signal of the fixed internet device, and storing the correlation in a home base station management system; executing a command by the femtocell access point, wherein the command is accessed from the internet via the fixed internet device; inquiring and acquiring the tag signal of the fixed internet device by the femtocell access point, and transmitting an access request to the home base station management system for accessing the internet, wherein the access request includes the tag signal acquired by the femtocell access point; identifying the tag signal of the femtocell access point by the home base management system, and analyzing the access request transmitted by the femtocell access point for acquiring the tag signal of the fixed internet device included in the access request; searching the correlation in the databank for the tag signal of the fixed internet device corresponding to the tag signal of the femtocell access point by the home base management system; and determining whether the tag signal of the fixed internet device in the access request matches the correlation by the home base station management system, transmitting a reply request to the femtocell access point for allowing the femtocell access point to access the internet via the fixed internet device if the tag signal of the fixed internet device in the access request matches the correlation, and transmitting a rejection request to the femtocell access point for not executing the access command.

In the method of the present invention, the tag signal of the femtocell access point and the tag signal of the fixed internet device are automatically recorded by the home base station management system. The method further includes: inquiring and acquiring the tag signal of the fixed internet device when executing a first turn on by the femtocell access point; transmitting the tag signal of the femtocell access point and the tag signal of the fixed internet device acquired by the femtocell access point to the home base station management system by the femtocell access point and establishing a corresponding correlation record in the correlation according to the tag signal of the femtocell access point and the tag signal of the fixed internet device by the home base station management system.

Accordingly, in the method of the present invention, when the FAP device fails to receive GPS or macro cell signals, the access service of the femtocell access point may be still effectively controlled by inquiring and determining whether the tag signal of the femtocell access point matches the tag signal of the fixed internet device.

DETAILED DESCRIPTION OF THE PREFERRED EMBODIMENTS

The detailed description of the present invention is illustrated by the following specific examples. Persons skilled in the art can conceive the other advantages and effects of the present invention based on the disclosure contained in the specification of the present invention.

Figure 1:
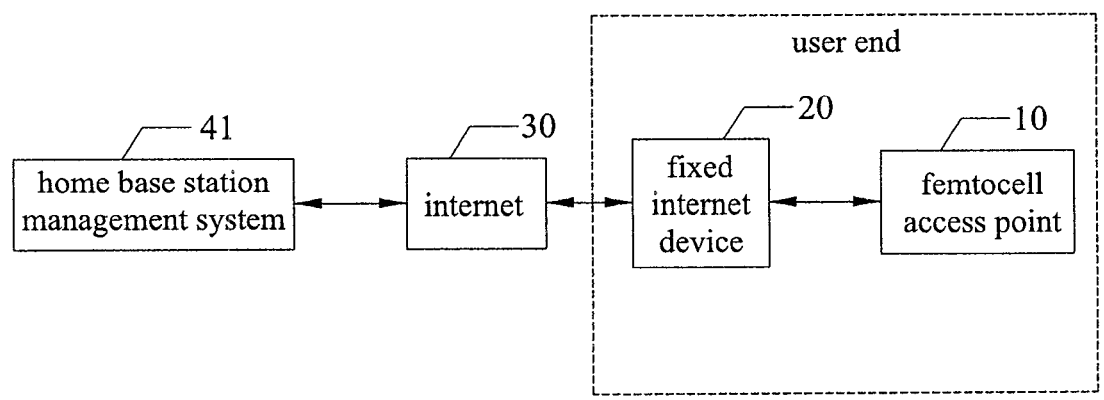
FIG. 1 is a schematic view the internet configuration using the method for controlling access at a user end according to the present invention.

FIG. 1 is a schematic view the internet configuration using the method for controlling access at a user end according to the present invention. As shown in FIG. 1, a femtocell access point (FAP) 10 is an equipment from a contract of a mobile communication company (or an internet service supplier), connects to internet 30 via an asymmetric digital subscriber line (ADSL) modem, an optical fiber transmission device or a cable modem, and provides wireless internet access services to the user end according to the wireless resource provided by the internet service supplier upon being licensed by the mobile communication company. Particularly, the method of the present invention is applicable to the FAP and a separated fixed internet device 20 such as an ADSL modem or a cable modem. When the user end would like to connect internet via the FAP 10, the license for the internet access request of the FAP 10 is determined by the home base station management system (HMS) 41. Upon the request is licensed, the FAP 10 is allowed to provide access services, such that even when the FAP 10 fails to receive GPS or macro cell signals, the access services of the FAP 10 may be still effectively controlled.

Figure 2:
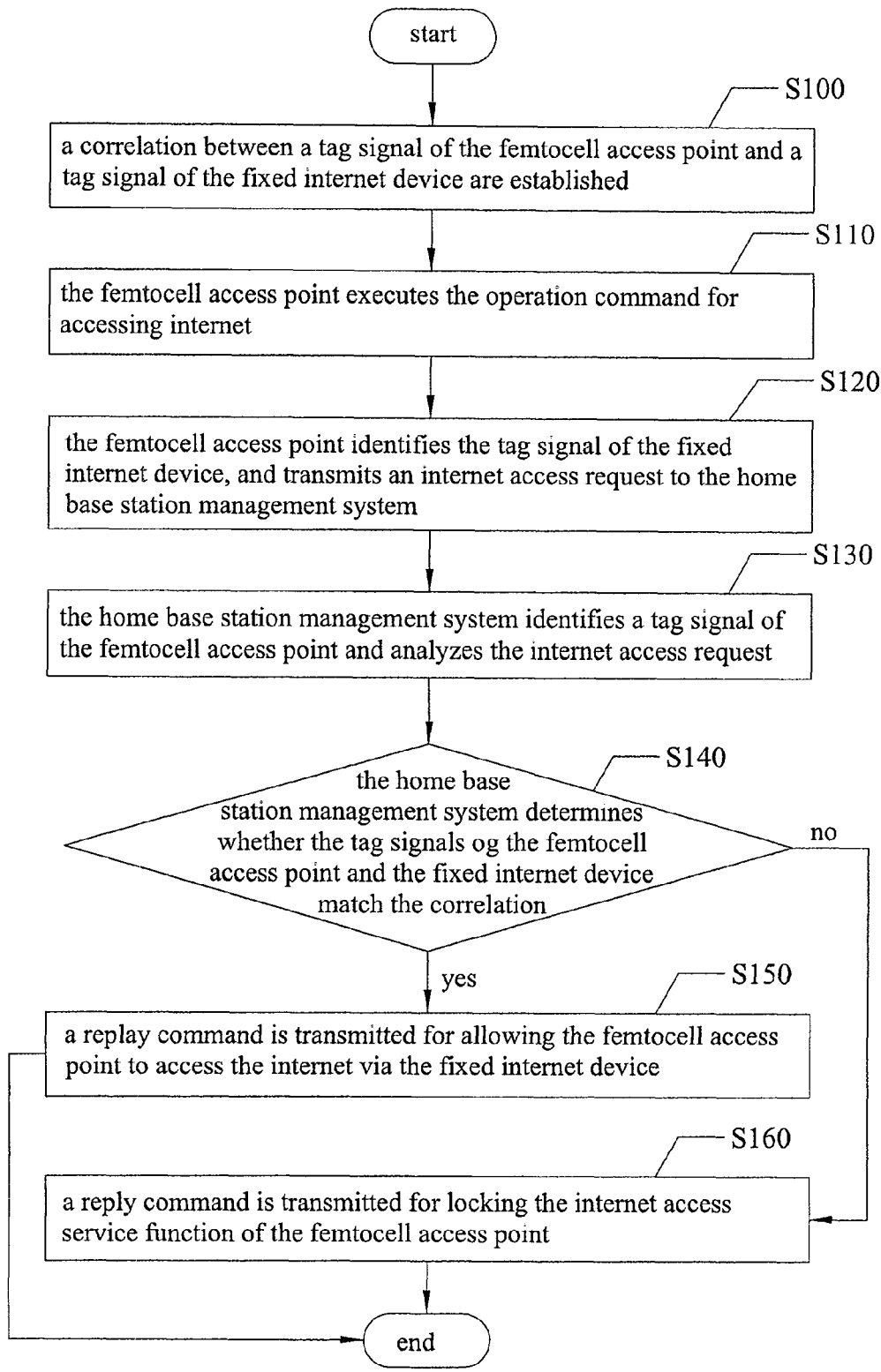
FIG. 2 is a flow chart showing the method for controlling access at a user end according to the present invention.

FIG. 2 is a flow chart showing the method for controlling access at a user end according to the present invention. As shown in FIG. 2, in the step S100, the correlation between the tag signal of the FAP and the tag signal of the fixed internet device is established, and the correlation is recorded in a data bank (not shown) in the home base station management system (HMS) 41. Specifically, a correlation is pre-established for recording the tag signal of each FAP 10 and allowing each FAP 10 to access the tag signal of the fixed internet device 20 of the service internet, wherein the tag signal of the FAP is the only identifier for identifying the FAP, and the tag signal of the FAP is a network access identifier (NAI), a media access control (MAC) address or an IP address. Similarly, the tag signal of the fixed internet device is the only identifier for identifying the fixed internet device, and may be a NAI, a MAC address or an IP address. In addition, the correlation may be established manually, or established by the home base station management system 41. Then, the step S110 is performed.

In the step S110, the FAP 10 at the user end executes the operation command accessed from the internet via the fixed internet 20. Then, the step S120 is performed.

In the step S120, the FAP 10 inquiries and acquires the tag signal of the fixed internet device 20. In this embodiment, the FAP 10 inquiries and acquires the tag signal of the fixed internet device (such as ADSL modem) via the predetermined network protocol (for example, simple network management protocol; SNMP), and transmits the access request to the home base station management system (HMS) 41 for accessing the internet, wherein the access request includes the tag signal of the fixed internet device 20 acquired by the FAP 10. Then, the step S130 is performed.

In the step S130, the home base station management system (HMS) 41 identifies the tag signal of the FAP 10, analyzes the access request, and acquires the tag signal of the fixed internet device included in the access request. Then, the step S140 is performed.

In the step S140, the home base station management system (HMS) 41 determines whether the tag signals of the FAP 10 and the fixed internet device 20 match the recorded data in the correlation. Specifically, the home base station management system (HMS) 41 searches the tag signal of the FAP 10 and the tag signal of the corresponding fixed internet device 20 in the correlation in the data bank according to the identified tag signal of the FAP 10, and then determines whether the search result matches the tag signal of the fixed internet device 20 included in the access request. If the search result matches the tag signal of the fixed internet device 20 included in the access request, the step S150 is performed. If the search result fails to match the tag signal of the fixed internet device 20 included in the access request, the step S160 is performed.

In the step S150, the home base station management system (HMS) 41 transmits a replay command to the FAP 10 for allowing the FAP 10 to access the internet via the fixed internet device 20.

In the step S160, the home base station management system (HMS) 41 transmits a reply to the FAP 10 for rejecting the FAP 10 to provide services and locking the internet access function of the FAP 10. Therefore, the internet access service of the FPA at the user end is effectively controlled.

The home base station management system 41 may add description to the correlation established in the step S100. The detailed operation is illustrated in FIG. 3.

Figure 3:
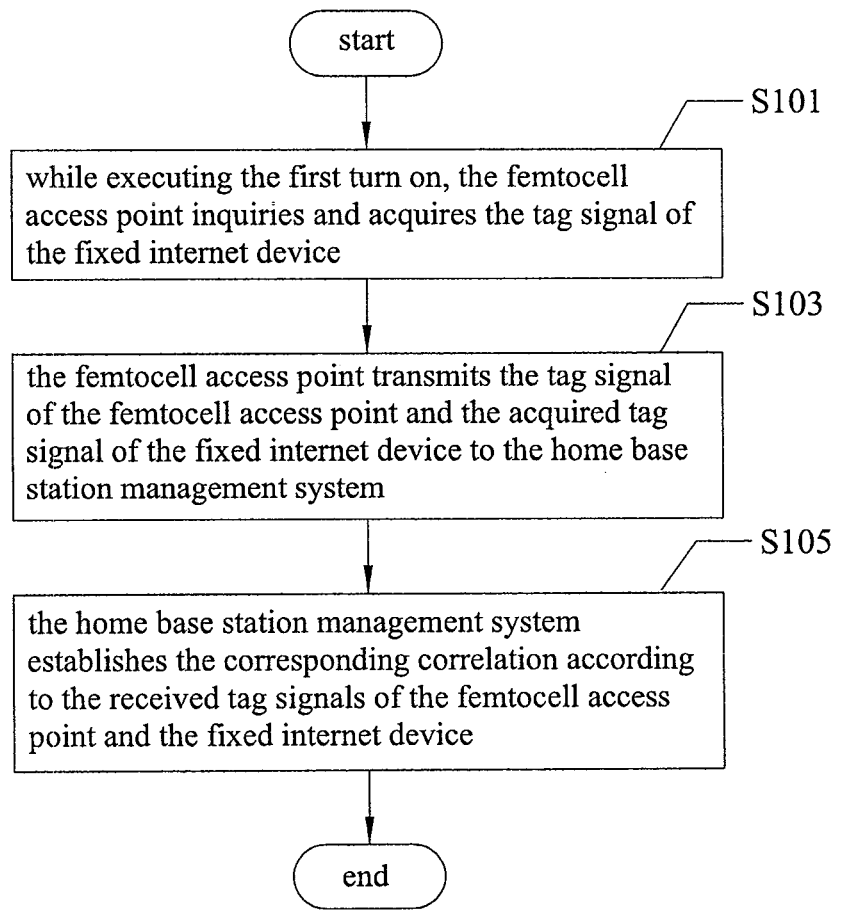
FIG. 3 is a flow chart showing the establishment of the correlation in FIG. 2 according to an embodiment of the present invention.

As shown in FIG. 3, in the step S101, when the FAP 10 at a user end executes the first turn on, the FAP 10 inquiries and acquires the tag signal of the fixed internet device 20 via the predetermined network protocol such as SNMP. Then, the step S103 is performed. The way for inquiring the FAP and the fixed internet device is not limited to SNMP. All network protocols which may be used for the FAP to access the fixed internet device can be used in the present invention.

In the step S103, the FAP 10 transmits the tag signal of the FAP 10 and the acquired tag signal of the fixed internet device 20 to the home base station management system (HMS) 41 through the management protocol such as TR069. Then, the step S105 is performed.

In the step S105, the home base station management system (HMS) 41 establishes the corresponding correlation according to the acquired tag signals of the FAP 10 and the fixed internet device 20.

Hence, in the present invention, a correlation is pre-established, such that the tag signal of the FAP and the tag signal of the fixed internet device are bound. Therefore, once the FPA would access the internet via the fixed internet device, it is to identify whether the tag signal of the FAP and the tag signal of the fixed internet device match the tag signals pre-established in the correlation in the data bank, so as to determine whether the FAP is allowed to access the internet. Hence, when the FAP at the user end fails to receive GPS or macro cell signals, the mobile communication company may still provide an effective mechanism for controlling the access services of the FAP.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

The invention claimed is:

1. A method for controlling access at a user end, wherein when the user end connects to Internet provided by a mobile communication company via a fixed internet device by using a femtocell access point, access services of the femtocell access point are controlled, comprising the steps of:

recording a tag signal of the femtocell access point, allowing the femtocell access point to access a tag signal of the fixed internet device, establishing in a data bank a correlation between the tag signal of the femtocell access point and the tag signal of the fixed internet device, and storing the correlation in a home base station management system;

executing a command by the femtocell access point, wherein the command is accessed from the Internet via the fixed internet device;

inquiring and acquiring the tag signal of the fixed internet device by the femtocell access point, and transmitting, by the femto cell access point, an access request to the home base station management system for accessing the Internet, wherein the access request includes the tag signal of the fixed internet device acquired by the femtocell access point;

identifying the tag signal of the femtocell access point by the home base management system, and analyzing the access request transmitted by the femtocell access point for acquiring the tag signal of the fixed internet device included in the access request;

searching the correlation in the data bank for the tag signal of the fixed internet device corresponding to the tag signal of the femtocell access point by the home base management system;

and determining whether the tag signal of the fixed internet device in the access request matches the correlation by the home base station management system, and transmitting a reply request to the femtocell access point for allowing the femtocell access point to access the Internet via the fixed internet device if the tag signal of the fixed internet device in the access request matches the correlation.

2. The method of claim 1, wherein the tag signal of the femtocell access point and the tag signal of the fixed internet device are automatically recorded by the home base station management system to form the correlation, in which the step of automatically recording comprises:

inquiring and acquiring the tag signal of the fixed internet device when executing a first turn on by the femtocell access point;

transmitting the tag signal of the femtocell access point and the tag signal of the fixed internet device acquired by the femtocell access point to the home base station management system by the femtocell access point; and establishing a corresponding correlation record in the correlation according to the tag signal of the femtocell access point and the tag signal of the fixed internet device by the home base station management system.

3. The method of claim 1, wherein the tag signal of the fixed internet device is inquired and acquired by the femtocell access point via a predetermined Internet protocol.

4. The method of claim 3, wherein the predetermined Internet protocol is a simple Internet management protocol.

5. The method of claim 3, wherein the predetermined Internet protocol is a protocol for retrieving a tag signal.

6. The method of claim 1, wherein the correlation between the tag signal of the femtocell access point and the tag signal of the fixed internet device is manually established.

7. The method of claim 1, wherein the fixed internet device is one of an asymmetric digital subscriber line modem, an optical fiber transmission device and a cable modem.

* * * * *